UNITED STATES PATENT OFFICE.

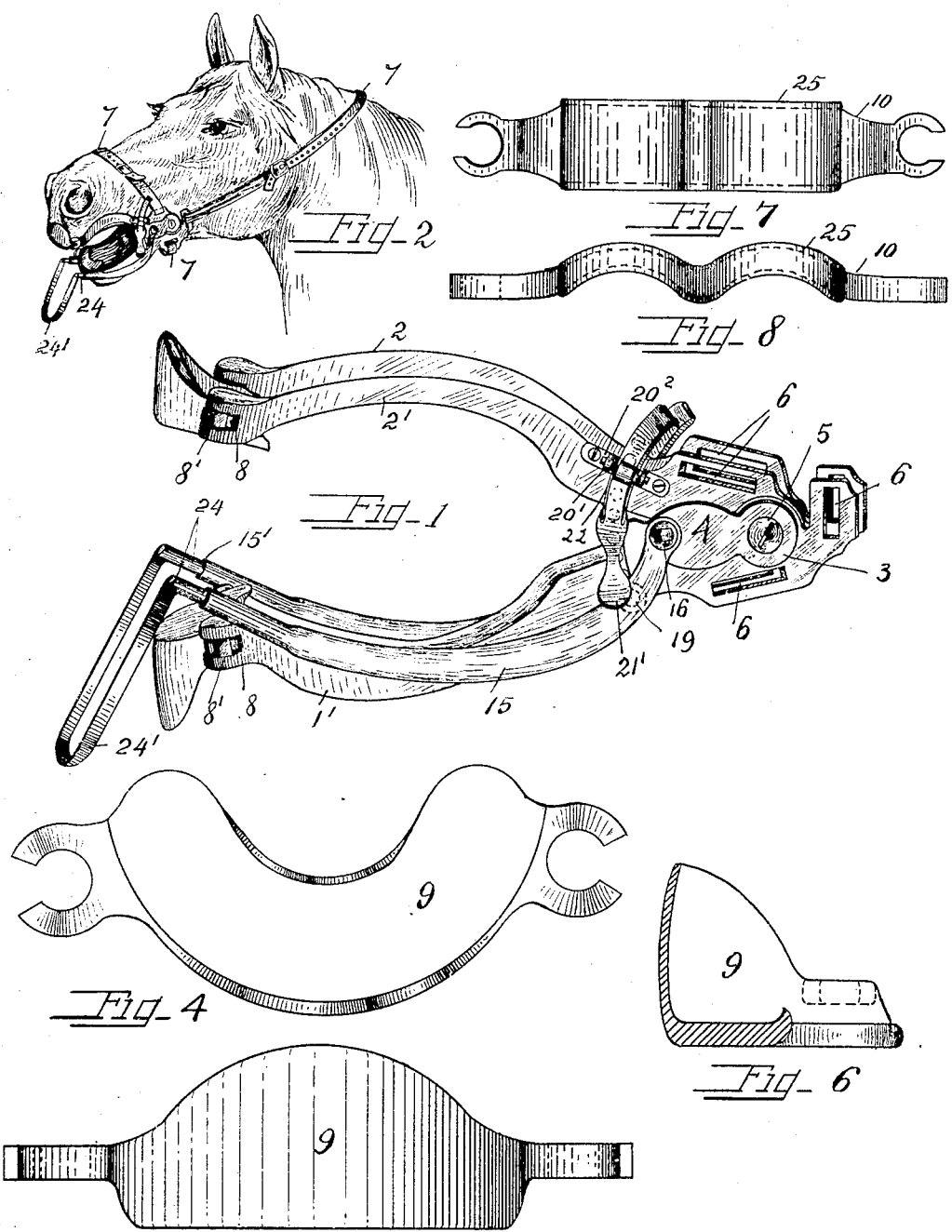

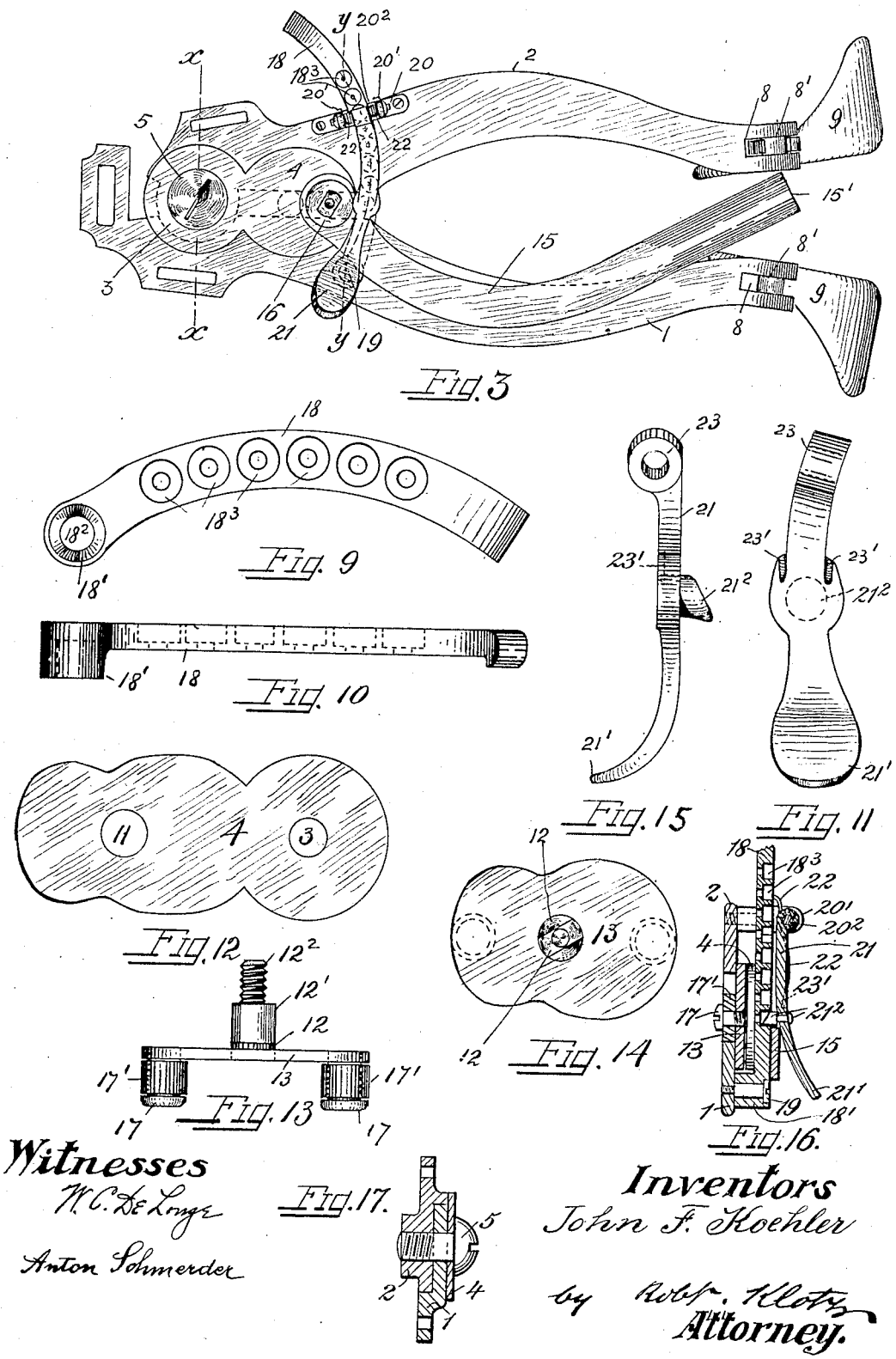

JOHN FRANZ KOEHLER, OF CHICAGO, ILLINOIS.

MOUTH-SPECULUM.

No. 869,439.         Specification of Letters Patent.         Patented Oct. 29, 1907.

Application filed November 24, 1906. Serial No. 344,816.

*To all whom it may concern:*

Be it known that I, JOHN FRANZ KOEHLER, a citizen of the United States, residing at Chicago, in the county of Cook and State of Illinois, have invented a new and useful Improvement in a Mouth-Speculum, of which the following is a clear and accurate specification.

My invention relates particularly to a mouth speculum of that class applied to horses and other domestic animals by veterinary surgeons for the purpose of making examination of and operating upon their teeth.

The speculum is introduced into the mouth in the same way as a bit and is provided with means whereby the opened mouth is held in that position. In the apparatus, now commonly in use this is attained by means of ratchet segments connected with the side of the bars forming the exterior part of the apparatus, which engage with a suitable stop, thus making it impossible for the animal to close its mouth while being operated upon. I have found, however, that it is necessary to provide the speculum with means whereby the animal is gently forced to open its mouth gradually, as it is often-times difficult to open it sufficiently wide so that the operation can be performed conveniently and with safety to the operator.

The object of my invention is therefore; first, to provide the speculum with exterior means whereby the animal's mouth is forced open gently and by degrees; second, to provide a ratchet mechanism that combines great strength with the impossibility of disengaging during the operation, thereby insuring the operator against any harm by reason of a premature closing of the animal's mouth; and third, to provide a simple method of disengaging the ratchet mechanism against any pressure which may be exerted by the animal upon the bars of the instrument. These objects are attained by the construction and arrangement of parts of the instrument as illustrated in the accompanying drawings and as will be hereinafter fully explained.

In the drawings Figure 1, is a perspective view of the complete instrument, Fig. 2, shows the manner in which it is attached to the head of the animal and the means whereby the opening of the latter's mouth is accomplished, Fig. 3, is a side elevation of the speculum, Fig. 4, 5 and 6, are detail views of the semi-lunar cupped plates which are inserted between the bars of the instrument as shown in Fig. 1, 2 and 3, Fig. 7 and 8, are detail views of the inter-dental plates, which are inserted in the place of the semi-lunar cupped plates for operation on the incisors, Fig. 9 and 10, are details of the curved ratchet bars, Fig. 11 and 15, represent detail views of the pawls, Fig. 12, is an elevation of the bearing plate, which supports the roller carrying plate, and Fig. 13 and 14 are a plan and side elevation respectively of one of the roller carrying plates. Fig. 16 is a section taken on line Y—Y of Fig. 3. Fig. 17 is a section taken on line X—X of Fig. 3.

Like figures represent corresponding parts throughout the various views.

The principal parts of the instrument consist of two semi-circular hinged bars on each side, of which bars and 1' are for the lower, and bars 2 and 2' for the upper jaw. The sets of bars are hinged together at point 3, at which point a plate 4, which I have termed the bearing plate, is placed flatly on the flat outer faces of the upper and lower bars and hinged therewith by means of a shoulder screw 5 which connects said sets of bars. Each bar is provided with a slot or slots 6 at the end adjacent to its hinged joint, which slots are for the purpose of attaching the required leather straps 7 for the purpose of securing the instrument to the animal's head, as shown in Fig. 2. On their other end, the bars are provided with another slot 8 and lock 8' for the reception of the semi-lunar cupped plates 9, or in their place of the inter-dental plates 10. These plates correspond with the width of the animal's head across its mouth and are readily exchangeable. The bearing plate 4 is provided at its other end with another hole 11 in which revolves the axle 12 of roller carrying plate 13. This roller carrying plate is slipped onto the bearing plate 4 from the inner side of the latter, and these parts when assembled are face to face against each other with the axle 12 extending through the aperture 11 and both plates rest upon the outer flat faces of hinged bars 1 and 2. Axle 12 of the plate 13 is provided with a square head 12' upon which is fitted the curved lever 15; the extreme end of the axle is provided with a screw thread $12^2$ and a nut 16 serves the purpose of securing the lever 15 with axle 12 and thereby with plate 13. The latter is provided on both of its ends with suitable studs 17, upon which are fitted rollers 17'; said plates 13 and their rollers are located between the lower and upper hinged bars 1 and 2, so that when lever 15 is swung downward, the forward roller bears down on the lower hinged bar 1, while the hindmost roller is pressed upwardly against the upper hinged bar 2, carrying the latter upward. The same parts are used on both sides of the instrument and for the same purpose.

When the mouth of the animal has been opened by using the power of lever 15 for that purpose, it must be held open in that position, this is accomplished by the following ratchet device:—The curved ratchet bar 18 is provided with a boss 18' at its lower end, containing a hole $18^2$, wherein is fitted a shoulder screw 19 and whereby the ratchet bar is swingingly fastened to the lower bar 1. The ratchet bar 18 contains a series of holes 18³, which are used for the purpose of engaging a corresponding pawl. Said bar passes through a bridge bracket 20, which is carried on the bar 2 and is provided with two lugs 20′ wherein is secured axle 20², upon which swings the pawl 21. The latter is formed at its lower end into an upturned handle 21′, and at the center, it is provided with a wedge-shaped projection 21² adapted to engage in said holes. A coiled spring 22 is wound around axle 20² on both sides of the pawl journal 23, one end of which is bent over the respective lug 20′, while the other end rests in a groove 23′ located on both sides of the wedge-shaped projection 21². By reason of the coil spring action the projection snaps into the holes 18³ located in the ratchet bar 18 whenever the hinged bars 1 and 2 are moved in the direction away from each other, and the pressure which may be exerted upon these hinged bars at their outermost point will tend to secure the engagement between the projection 21² and the ratchet holes 18³ all the more owing to the wedge-shape of the projection. Levers 15 are provided at their outer end with a round opening 15′ into which the bars 24 of forked-extension 24′ may be slipped; the latter is simply for the purpose of offering a handle to the operator whereby a simultaneous action may be exerted upon both sides of the instrument, so that the mouth of the animal is forced open gradually and in a straight line.

It will be seen that similar appliances may be used for the purpose as set forth, without departing from the scope of this invention, but for practical use I prefer to apply the apparatus in the following manner. The semi-lunar cupped plates 9 are fastened between the hinged bars in their respective slots 8 and the former are then slipped between the animal's incisors in the same manner as a bit. The instrument is then secured to the animal's head by means of straps 7 and the bars 24 of forked handle 24′ are then inserted in their respective holes or bearings 15′. The operator then grips the forked handle and forces it downward, whereby a pressure is exerted upon rollers 17′; these are acting in their turn upon the lower and upper hinged bars, forcing the latter apart. During this movement the pawl 21 slides on the ratchet bar and its wedge-shaped projection engages the holes 18³ one after another as it meets them. When the mouth of the animal has been opened sufficiently, the forked handle is removed and the wedge-shaped projection engages the corresponding ratchet hole firmly. If the incisors are to be operated upon, the semi-lunar plates 9 are replaced by the inter-dental plates 10. The instrument is slipped further up into the animal's mouth, so that the inter-dental plates rest upon the gum-parts, In order to prevent injury to the gums, the plates are protected by a heavy rubber-lining 25, which is slipped over the latter in the form of a rubber hose. When the operation has been finished the pawls may be disengaged by hand, for which purpose the handles 21′ can be used, or a simultaneous disengagement may be effected by the use of the forked-handle 24′, in connection with levers 15, by moving the latter upward, whereby they are passed under the corresponding handle 21′; this raises the pawl and disengages the wedge-shaped projection and allows closing of the animal's mouth.

Having thus fully explained my invention, what I claim as new, and desire to secure by Letters Patent, is—

1. A speculum of the class specified, comprising a set of hinged lower and upper bars, a set of inter-dental plates detachably secured between the respective lower and upper hinged bars, a bearing plate hinged with each set of bars, a roller carrying plate journaled in the said bearing plate, a set of rollers on said roller carrying plate and located between the hinged bars, means secured with the said roller carrying plate for the purpose of forcing the forward roller upon the lower hinged bar and the hind roller against the upper hinged bar, whereby the instrument is forced open, substantially as described.

2. In a speculum of the class specified, the combination, of a set of lower and upper hinged bars, with a set of semi-lunar cupped plates detachably secured with the respective set of hinged bars, a bearing plate hinged with each set of lower and upper bars, a roller carrying plate journaled in the said bearing plate, a set of rollers secured with the said roller plate and placed between the respective lower and upper hinged bar, a lever rigidly secured with the corresponding roller plate, a ratchet bar containing a series of ratchet holes and swingingly secured with each lower hinged bar, and a pawl secured with the upper hinged bars and sliding upon the said ratchet bar for the purpose of engaging the holes therein, substantially as described.

3. In a speculum of the class specified, the combination, of a set of lower and upper hinged bars, with dental plates detachably secured with the respective set of hinged bars, a bearing plate hinged with the said lower and upper bars, a roller carrying plate journaled in the said bearing plate, a set of rollers secured with the said roller carrying plate and placed between the respective lower and upper hinged bars, a lever rigidly secured with the corresponding roller carrying plate, a ratchet bar containing a series of ratchet holes and swingingly secured with each lower hinged bar, a bridge bracket fastened to each upper hinged bar, a pair of lugs thereon between which the said ratchet bar is guided, a stationary axle 20² in the said lugs, a pawl 21 swinging up and down thereon, a coil spring 22 wound around the said axle and bearing down upon the said pawl for the purpose of forcing the pawl into engagement with the holes of the said ratchet bar, substantially as described.

4. In a speculum of the class specified, the combination, of a set of lower and upper hinged bars, with dental plates detachably secured with the respective set of hinged bars, a bearing plate hinged with the said lower and upper bars, a roller carrying plate journaled in the said bearing plate, a set of rollers secured with the said roller carrying plate and placed between the respective lower and upper hinged bars, a set of levers rigidly secured with the corresponding roller carrying plate, a forked handle 24′ attached to the said set of levers, a ratchet bar containing a series of ratchet holes and swingingly secured with each lower hinged bar, a bridge bracket fastened to each upper hinged bar, a pair of lugs thereon between which the said ratchet bar is guided, a stationary axle 20² in the said lugs, a pawl swinging up and down thereon, a wedge-shaped projection on the said pawl for the purpose of engaging the holes of the said ratchet bar, and a coil spring 22 wound around the said axle 20² and compelling the said projection to engage the said ratchet holes, substantially as described.

5. In a speculum of the class specified, the combination, of a set of lower and upper hinged bars, with dental plates detachably secured with the respective set of hinged bars, a bearing plate hinged with each of the said lower and upper bars, a roller carrying plate journaled in each bearing plate, a set of rollers thereon and placed between the said lower and upper bars, a set of levers rigidly secured with the corresponding roller carrying plate and adapted to receive a forked extension handle, a set of ratchet bars containing a series of holes and swingingly secured with the corresponding lower hinged bars, means secured with each of the upper hinged bars wherein the said ratchet bars are guided, a set of pawls journaled in the said means and gliding upon the said ratchet bars, a wedge-shaped projection secured with the said pawl for the purpose of engaging the said holes in the ratchet bars, and means whereby the projection is forced into engagement with the said ratchet bars when the instrument is swung open, substantially as described.

In testimony whereof I have signed my name to this specification in the presence of two subscribing witnesses.

JOHN FRANZ KOEHLER.

Witnesses:
F. W. BEYENBACH,
J. C. GOOSMANN.